United States Patent
Itami et al.

(10) Patent No.: US 9,127,733 B2
(45) Date of Patent: Sep. 8, 2015

(54) FRICTION MATERIAL

(75) Inventors: Eri Itami, Tokyo (JP); Hiroshi Yamamoto, Tokyo (JP); Takayuki Watanabe, Tokyo (JP); Katsuji Seki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/344,426

(22) PCT Filed: Sep. 13, 2012

(86) PCT No.: PCT/JP2012/073547
§ 371 (c)(1),
(2), (4) Date: Mar. 12, 2014

(87) PCT Pub. No.: WO2013/039183
PCT Pub. Date: Mar. 21, 2013

(65) Prior Publication Data
US 2014/0342899 A1 Nov. 20, 2014

(30) Foreign Application Priority Data

Sep. 14, 2011 (JP) ................................ 2011-201072
Jul. 17, 2012 (JP) ................................ 2012-158743

(51) Int. Cl.
*F16D 69/02* (2006.01)
*C09K 3/14* (2006.01)
*F16D 13/60* (2006.01)

(52) U.S. Cl.
CPC ............ *F16D 69/028* (2013.01); *F16D 69/026* (2013.01); *F16D 13/60* (2013.01); *F16D 2200/0065* (2013.01); *F16D 2200/0069* (2013.01); *F16D 2200/0086* (2013.01)

(58) Field of Classification Search
CPC ..... F16D 69/026; F16D 69/028; F16D 13/60; F16D 2200/0069; F16D 2200/0086; F16D 2200/0065; C09K 3/14; C09K 3/149
USPC ......................................................... 106/36
See application file for complete search history.

(56) References Cited

U.S. PATENT DOCUMENTS

| 5,098,758 | A | 3/1992 | Kani |
| 5,383,963 | A | 1/1995 | Kobayashi et al. |
| 5,952,416 | A | 9/1999 | Tani et al. |
| 6,897,173 | B2 * | 5/2005 | Bernard et al. ................. 501/36 |
| 7,740,698 | B2 | 6/2010 | Kitami et al. |
| 7,901,659 | B2 | 3/2011 | Itoi |
| 7,914,871 | B2 * | 3/2011 | Unno ........................... 428/66.2 |
| 8,241,595 | B2 | 8/2012 | Itoi |
| 2002/0034623 | A1 | 3/2002 | Hikichi et al. |
| 2007/0219289 | A1 | 9/2007 | Phipps et al. |
| 2008/0249222 | A1 | 10/2008 | Itoi |
| 2013/0096228 | A1 | 4/2013 | Yamamoto et al. |
| 2013/0158162 | A1 * | 6/2013 | Hatano et al. ................. 523/155 |

FOREIGN PATENT DOCUMENTS

| CN | 101631747 A | 1/2010 |
| EP | 1 070 751 A1 | 1/2001 |
| JP | H03-181529 A | 8/1991 |
| JP | H06-248091 A | 9/1994 |
| JP | 2002-020730 A | 1/2002 |
| JP | 2007-277418 A | 10/2007 |
| JP | 2008-179806 A | 8/2008 |
| JP | 2009-091422 A | 4/2009 |
| JP | 2010-242002 A | 10/2010 |
| JP | 2010-285558 A | 12/2010 |
| JP | 2011-007283 A | 1/2011 |
| WO | WO-2008/123046 A1 | 10/2008 |
| WO | WO-2011/158917 A1 | 12/2011 |
| WO | WO2012/029923 A1 * | 3/2012 ............... C09K 3/14 |

OTHER PUBLICATIONS

Chinese Office Action dated Oct. 30, 2014 in corresponding Chinese Patent Application No. 201280045068.0.
Extended European Search Report dated Jun. 11, 2015 that issued in the corresponding European Patent Application No. EP 12831024.

* cited by examiner

Primary Examiner — Anthony J Green
(74) Attorney, Agent, or Firm — Drinker Biddle & Reath LLP

(57) ABSTRACT

A friction material contains: at least one kind of a titanate compound having a shape having a plurality of convex portions; and a bio-soluble inorganic fiber. In the titanate compound, a three-dimensional shape of a particle thereof has a plurality of convex portions.

5 Claims, 1 Drawing Sheet

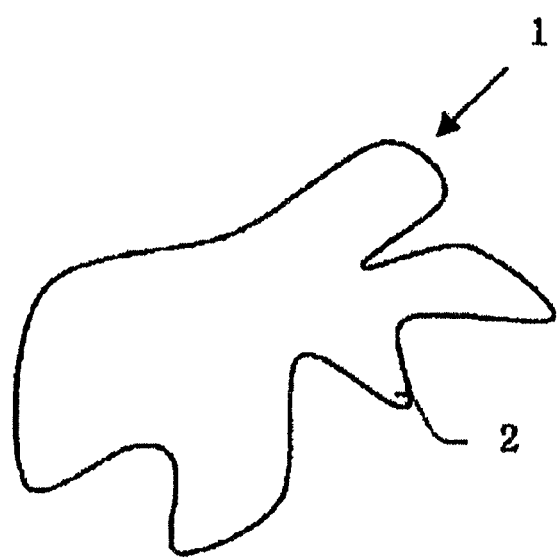

FRICTION MATERIAL

TECHNICAL FIELD

The present invention relates to a friction material to be used particularly for brake pads, brake linings, clutch facings and the like for automobiles, railway vehicles, industrial machines and the like.

BACKGROUND ART

A friction material to be used for brakes such as disk brakes and drum brakes, clutches or the like is composed of materials such as a fiber base material for exerting a reinforcing function, a friction adjusting material for imparting a friction function and adjusting its friction performance and a binding material for integrating these components.

However, with recent high-performance and speeding-up of vehicles, the role of brakes has become increasingly severe. Further, in the movement toward weight reduction of the vehicles, it has become necessary to improve high-temperature strength of friction materials as soon as possible.

In conventional friction materials, reinforcing fillers have been used in order to increase the strength thereof. However, from working environmental and health requirements, a technique using a non-whisker-like filler or a bio-soluble inorganic fiber is known. For example, Patent Document 1 describes a friction material containing a non-whisker-like titanate compound and bio-soluble inorganic fiber, and Patent Document 2 describes a friction material in which a bio-soluble inorganic fiber is specified by a specific content and a specific Mohs hardness.

The filler as used herein is described, for example, in the plastic sector of JIS, as "a relatively inert solid material to be added to a plastic in order to modify its strength, durability, working characteristics or other performances, or in order to lower costs" (quoted from JIS K6900). The fillers are usually classified by the chemical composition (for example, oxides, hydroxides, carbonates, sulfates, silicates, nitrides, carbons, organic materials, titanate compounds, various metal powders and the like), by the shape (for example, fibrous, acicular, plate-like, scale-like, spherical, granular and the like), or by the use (for example, bulking use, reinforcement use, thermal conductivity, damping, slidability, flame retardancy and the like). Also in the field of friction materials, the fillers are used as the fiber base material or the friction adjusting material.

On the other hand, amorphous potassium titanate having a shape in which a plurality of protrusions (convex portions) extend in irregular directions is known as a friction adjusting material having reinforcing performance for a friction material (for example, see Patent Document 3).

Further, at present, a general NAO (non-asbestos organic) friction material contains up to about 20% by mass of a copper fiber or a copper powder, and such a copper element is effective for strength reinforcement and improvement of the friction coefficient of the friction material, and further is effective for, at 400° C. or more, the maintenance of the friction coefficient, improvement of heat release efficiency and wear resistance. Furthermore, different from steel fiber, this has the features that counterpart material attack which increases the wear volume of a counterpart material (disk rotor) is small, and that rust is less likely to occur. However, as described in Patent Document 4, the copper element contained in the friction material is discharged as a wear powder by braking, and the influence thereof on natural environment has been pointed out.

PRIOR-ART DOCUMENTS

Patent Documents

Patent Document 1: JP 2007-277418 A
Patent Document 2: JP 2009-91422 A
Patent Document 3: WO 2008/123046 A1
Patent Document 4: JP 2010-285558 A

OUTLINE OF THE INVENTION

Problems that the Invention is to Solve

Patent Document 1 describes that even when the bio-soluble inorganic fiber is used, high wear resistance obtained by the titanate compound is scarcely inhibited. However, a plate-like or scale-like filler is used in place of a whisker-like filler, so that there has been a possibility that an increase in wear, a crack or a chip occur due to insufficient strength of the friction material at a high temperature under a high load to thereby decrease a brake function, as compared to the case of using the whisker-like filler. In particular, a friction material whose strength is sufficiently secured in a high temperature region of a rotor temperature of 400° C. or more has been desired.

Further, as described in Patent Document 2, when the bio-soluble inorganic fiber is used, there has been a problem that the friction material is more worn during the rust removal of a counterpart material (disk rotor), resulting in poor rust removability, as compared to the case of using bio-insoluble inorganic fiber.

Accordingly, an object of the present invention is to provide a friction material excellent in rust removability and friction material strength, and particularly improved in friction material strength in a high temperature region, giving consideration to working environment and health and natural environment.

Means for Solving the Problems

The present invention solves the above-mentioned problems and has the following constitutions.

(1) A friction material, comprising: at least one kind of a titanate compound having a shape having a plurality of convex portions; and a bio-soluble inorganic fiber.

(2) The frictional material according to (1), wherein the bio-soluble inorganic fiber contains at least one kind of silicon dioxide ($SiO_2$), magnesium oxide (MgO) and strontium oxide (SrO) as a chemical component thereof.

(3) The friction material according to (1) or (2), wherein the bio-soluble inorganic fiber is contained in an amount of 0.5 to 25% by volume.

(4) The friction material according to any one of (1) to (3), wherein at least one kind of the titanate compound having a shape having a plurality of convex portions is contained in an amount of 2 to 35% by volume.

(5) The friction material according to (1), containing no copper element.

According to the present invention, the titanate compound having a shape having a plurality of convex portions is used in place of a plate-like or scale-like titanate compound, in combination with the bio-soluble inorganic fiber, thereby significantly improving the friction material strength that has been a problem in the case of the conventional plate-like or scale-like titanate compound, and sufficiently improving also the rust removability that have been a problem in the case of the bio-soluble inorganic fiber. It has been found that these performances are significantly improved by the combination of both components, thus leading to the present invention. Focusing attention on the shape of the titanate compound having a shape having a plurality of convex portions, which is used in the present invention, this is easily caught by and fixed to a three-dimensional network structure of the bio-soluble inorganic fiber to be less likely to fall off by its shape having the convex portions, during the course of friction with a counterpart material (disk rotor), as compared to the plate-like or scale-like titanate compound. As a result, wear resistance of the titanate compound itself is easily sustained. It is therefore presumed that the friction material is less worn during the rust removal of the counterpart material (disk rotor) to thereby improve the rust removability, as compared to the conventional friction material using the plate-like or scale-like titanate compound. Further, the titanate compound having the specific shape of the present invention is less likely to fall off as described above, so that it is considered that, even if the friction material of the present invention contains no copper element, the friction material strength is not decreased even in such a high temperature region as 400° C. or more, and thus, the friction material shows wear resistance. The phrase "containing no copper element" as used herein means that no copper fiber, no copper powder and no cupper-containing alloy (such as brass or bronze) and compound thereof are contained as a raw material of the friction material.

Advantageous Effects of the Invention

According to the present invention, therefore, a friction material excellent in rust removability and friction material strength is obtained without using a whisker-like filler that is unfavorable in terms of working environment and health as a reinforcing material of the friction material. In particular, an excellent friction material, in which the friction material strength in a high temperature region of a rotor temperature of 400° C. or more can be improved and consideration is given to working environment and health and natural environment, can be obtained.

BRIEF DESCRIPTION OF THE DRAWINGS

FIG. 1 is a projection view for illustrating a titanate compound having a shape having a plurality of convex portions, which is used in the present invention.

MODE FOR CARRYING OUT THE INVENTION

A friction material of the present invention is characterized by containing a titanate compound having a shape having a plurality of convex portions; and a bio-soluble inorganic fiber. The friction material of the present invention is described in detail below. In this specification, "mass" shall be also considered to mean "weight".

[Friction Adjusting Material]
(Titanate Compound Having a Shape Having a Plurality of Convex Portions)

In the present invention, at least one kind of a titanate compound having a shape having a plurality of convex portions is contained. The titanate compound in the present invention means that the three-dimensional shape of a particle thereof has a plurality of convex portions. "Having a shape having a plurality of convex portions" as used herein means that a projected shape of the titanate compound of the present invention onto a plane can take at least a shape having convex portions in two or more directions, different from an ordinary polygon, a circle, an ellipse and the like. Specifically, this convex portion means a portion protruded from a polygon, a circle, an ellipse or the like (a basic FIGURE) fitted to a photograph (projection view) taken by an electron microscope. As the projection view of the titanate compound 1 of the present invention, for example, one described in FIG. 1 is exemplified, and the convex portion is indicated by the reference numeral 2. Specific three-dimensional shapes of the titanate compound of the present invention include a boomerang shape, a cross shape, an amoeba shape, parts (for example, hands, horns, leaves and the like) of various animals and plants or the whole or analogous shapes thereof, a Konpeito shape and the like.

Examples of the titanate compounds of the present invention include potassium titanate, sodium titanate, lithium titanate, calcium titanate, magnesium titanate, barium titanate, strontium titanate and the like, which may be used either alone or as a combination of two or more thereof. Among these, if it is used as a blending material in the friction material, potassium hexatitanate, potassium octatitanate or sodium hexatitanate is preferred from which alkali metal ions sometimes causing degradation of a resin (binding material) constituting a matrix of the friction material are less eluted.

The average particle diameter of the titanate compound of the present invention is preferably from 1 to 50 and more preferably from 5 to 20 µm.

The titanate compound having a shape having a plurality of convex portions is a known inorganic friction adjusting material, and can be obtained, for example, by a method described in WO 2008/123046 A1. For example, the potassium titanate having a specific shape of the present invention can be produced as follows: an oxide of an atom constituting potassium titanate having an ordinary shape, a salt and the like are mixed by a Henschel mixer, and then, mixed while performing mechanochemical pulverization with a vibration mill to thereby form a mixture having high reaction activity, and then this is fired.

The titanate compound having a plurality of convex portions of the present invention is contained preferably in an amount of 2 to 35% by volume, and more preferably in an amount of 10 to 20% by volume, in the whole of the friction material. In an amount of 2% by volume or more, the effects of the present invention can be sufficiently obtained. Further, in an amount of 35% by volume or less, a sufficient compressive deformation amount of a pad is obtained, and good vibration characteristics can be obtained.

(Other Friction Adjusting Materials)

Examples of the friction adjusting materials used in the present invention include, for example, metal oxides other than the above-mentioned potassium titanate, such as alumina, silica, magnesia, zirconia, chromium oxide, molybdenum dioxide and zirconium silicate, organic material dusts such as synthetic rubbers and cashew resins, metals such as copper, aluminum and tin, minerals such as vermiculite and mica, plate-like, scale-like or powdery potassium titanate other than the titanate compound of the present invention, barium sulfate, calcium carbonate and the like, which may be used either alone or as a combination of two or more thereof. These are used as a powder or the like, and the particle diameter and the like are variously selected. However, in the present invention, it is preferred to contain no copper element, from the viewpoint of giving consideration to natural environment, as described above.

In the present invention, the friction adjusting materials (including the titanate compound having a plurality of convex portions of the present invention) are used usually in an amount of 30 to 80% by volume, and preferably in an amount of 60 to 80% by volume, in the whole of the friction material.

[Fiber Base Material]
(Bio-Soluble Inorganic Fiber)

In the present invention, the bio-soluble inorganic fiber is used as a fiber base material. The bio-soluble inorganic fiber in the present invention is an inorganic fiber having the feature that even when incorporated into a human body, it is decomposed in a short period of time and eliminated from the body, and means an inorganic fiber satisfying that the total amount of alkali metal oxides and alkaline earth metal oxides (the total amount of oxides of sodium, potassium, calcium, magnesium and barium) is 18% by mass or more in a chemical composition, and that the mass half-life of the fiber of 20 µm or less is within 10 days in a respiratory short-term biodurability test, or that the mass half-life of the fiber of 20 µm or more is within 40 days in a short-term biodurability test at the time of intratracheal injection, or that there is no evidence of excessive carcinogenicity in an intraperitoneal test, or that there is no relating pathogenicity or tumor occurrence in a long-term respiration test (Note Q (exclusion from application of carcinogenicity) of EU directive 97/69/EC).

Such bio-soluble inorganic fiber preferably contains at least one kind of $SiO_2$, MgO and SrO as a chemical composition thereof, and specific examples thereof include bio-soluble ceramic fiber such as $SiO_2$—CaO—MgO-based fiber, $SiO_2$—CaO—MgO—$Al_2O_3$-based fiber or $SiO_2$—MgO—SrO-based fiber, bio-soluble rock wool and the like. In the present invention, the $SiO_2$—MgO—SrO-based fiber is preferred in that it has excellent heat resistance equivalent to that of alumina silica fiber, and further, has excellent biosolubility and water resistance. Further, such a bio-soluble inorganic fiber is produced by fiber formation of a raw material of the inorganic fiber by a commonly used melt spinning process or the like.

As the bio-soluble ceramic fiber such as the $SiO_2$—CaO—MgO-based fiber, the $SiO_2$—CaO—MgO—$Al_2O_3$-based fiber or the $SiO_2$—MgO—SrO-based fiber, and the bio-soluble rock wool, it is possible to use commercially available ROCK WOOL RB220-Roxul1000 (manufactured by Lapinus B.V.), FINE FLEX-E BULK FIBER-T (manufactured by Nichias Corporation), BIOSTAR BULK FIBER (manufactured by ITM Co., Ltd.) and the like.

The bio-soluble inorganic fiber of the present invention has preferably a fiber diameter of 0.1 to 10 µm and a fiber length of 1 to 1000 µm, and more preferably a fiber diameter of 0.2 to 6 µm and a fiber length of 10 to 850 µm. The effects of the present invention can be effectively exhibited within these ranges. Further, in the bio-soluble inorganic fiber of the present invention, in general, shots (granulated substances) which has not been formed into the fiber is generated in the production process, and these shots are contained in the fiber. The shot content in the bio-soluble inorganic fiber of the present invention is preferably from 0.1 to 70%. It is also possible to separate the bio-soluble inorganic fiber of the present invention from the shots, and to blend them at any rate to use.

The bio-soluble inorganic fiber is not particularly limited as long as within the above-mentioned definition. Further, the bio-soluble inorganic fiber of the present invention may be surface-treated with a silane coupling agent or the like on a surface thereof.

The content of the bio-soluble inorganic fiber is preferably from 0.5 to 25% by volume, and more preferably from 1 to 20% by volume, based on the whole of the friction adjusting material. Sufficiently good rust removability and friction material strength can be obtained within this range.

(Other Fiber Base Materials)

In the present invention, another fiber base material can be used together within the range not impairing the effects of the present invention. The fiber base material that can be used in the present invention may be either organic or inorganic. For example, examples of the organic ones include aromatic polyamide (aramid) fiber, polyacrylic fiber and the like, and examples of the inorganic ones include metal fiber such as copper or steel, potassium titanate fiber, $Al_2O_3$—$SiO_2$-based ceramic fiber, glass fiber, carbon fiber, rock wool and the like. These are used either alone or as a combination of two or more thereof. However, in the present invention, it is preferred to contain no copper element such as copper fiber, from the viewpoint of giving consideration to natural environment, as described above.

In the present invention, the fiber base material (including the bio-soluble inorganic fiber) is used usually in an amount of 2 to 35% by volume, and preferably in an amount of 9 to 28% by volume, in the whole of the friction material.

[Binding Material]

Examples of the binding materials to be used in the present invention include thermosetting resins such as phenol resins (including straight phenol resins and various phenol resins modified with rubber or the like), melamine resins, epoxy resins and polyimide resins.

In the present invention, the binding materials are used usually in an amount of 10 to 30% by volume, and preferably in an amount of 14 to 20% by volume, in the whole of the friction material.

[Production of Friction Material]

In order to produce the friction material of the present invention, it can be produced by blending the above-mentioned respective components, preforming the resulting blend according to an ordinary manufacturing method, and performing treatments such as thermoforming, heating and grinding.

A brake pad including the above-mentioned friction material can be produced by thermoforming a pressure plate which has been formed into a predetermined shape with a sheet-metal press, has been subjected to degreasing treatment and primer treatment and has been coated with an adhesive, and a preformed body of the above-mentioned friction material, at a predetermined temperature and pressure in a thermoforming step to integrally fix both members, performing aftercuring, and finally performing finishing treatment.

EXAMPLES

The present invention is specifically described below by examples. However, the present invention should not be limited to these examples alone.

Examples 1 to 9

Friction material mixtures were obtained by uniformly mixing blending ingredients of friction materials having compositions (% by volume) shown in Table 1 in a mixer. Subsequently, the friction material mixtures were preformed at room temperature and a pressure of 6 MPa, thereafter, was subjected to heat pressure forming at a temperature of 140 to 170° C. and a forming surface pressure of 30 to 80 MPa for 5 minutes, and then, was heat-treated at a temperature of 150 to 300° C. and a tightening of 980 to 7840 N for 1 to 4 hours to thereby obtain friction materials. The resulting friction materials were evaluated by the following.

1) Rust Removability
Evaluation was performed by the procedure shown below.
(a) A 5 mass % salt aqueous solution is sprayed on a disk rotor.
(b) The disk rotor of the above (a) was allowed to stand in a temperature humidity controlled oven maintained at a temperature of 50° C.±1° C. and a humidity of 95±1% for 3 hours and 15 minutes in accordance with JIS D4419, and thereafter dried under conditions of 70±1° C. and a humidity of 15±1% for 2 hours and 30 minutes.
(c) The operation of the above (b) was repeated until the rust thickness became 70 μm.
(d) The rotor with rust of the above (c) was braked under the friction conditions in accordance with JASO C427.
(e) The rust removability was evaluated by the rust removal rate at the 100th braking in the number of brakings.

For the rust removability measured as described above, 90% or more was evaluated as A, 80% or more and less than 90% was evaluated as B, 70% or more and less than 80% was evaluated as C, and less than 70% was evaluated as D.

2) Friction material wear property at 400° C.: A wear test at 400° C. was performed with a dynamo tester in accordance with JASO C427.
For the friction material wear amount (unit: mm) at 400° C. measured as described above, less than 1.0 was evaluated as A, 1.0 or more and less than 1.5 was evaluated as B, 1.5 or more and less than 2.0 was evaluated as C, and 2 or more was evaluated as D.

3) Shear strength at 400° C.: A test piece (30×10×4.8 mm in thickness) of the above-mentioned friction material was prepared, and measurement was performed in accordance with JIS D4422.

For the shear strength (unit: kN) at 400° C. measured as described above, 2.0 or more was evaluated as A, 1.5 or more and less than 2.0 was evaluated as B, 1.0 or more and less than 1.5 was evaluated as C, and less than 1.0 was evaluated as D.

4) Working environmental property: When an influence on the inside of a body of a worker of a friction material production is considered, even the inorganic fiber is desirably bio-soluble. Further, it is more preferred to further use a non-whisker-like friction adjusting material. The case where blending materials having a little influence on the inside of a body were used as both of the fiber base material and the friction adjusting material was evaluated as A, and the case where used as either the fiber base material or the friction adjusting material was evaluated as C.

Comparative Examples 1 to 3 and Reference Example 1

Friction materials of Comparative Examples 1 to 3 and Reference Example 1 were obtained in the same manner as in Example 2 with the exception that the bio-insoluble inorganic fiber and/or plate-like potassium titanate were used in place of the bio-soluble inorganic fiber and potassium titanate used in Example 2. In Reference Example 1, copper fiber and plate-like potassium titanate were used in place of the bio-soluble inorganic fiber and potassium titanate, which corresponds to a conventional general friction material containing a copper fiber.

The results thereof are shown together in Tables 1 to 3.

TABLE 1

| Blending material, % by volume | | Example 1 | Example 2 | Example 3 | Example 4 | Example 5 | Example 6 | Example 7 | Example 8 | Example 9 |
|---|---|---|---|---|---|---|---|---|---|---|
| Fiber base material | Aramid fiber | 8.0 | 8.0 | 8.0 | 8.0 | 8.0 | 8.0 | 8.0 | 8.0 | 8.0 |
| | Copper fiber | 0.0 | 0.0 | 0.0 | 0.0 | 0.0 | 0.0 | 0.0 | 0.0 | 0.0 |
| | Bio-soluble inorganic fiber | 1.0 | 7.0 | 20.0 | 0.5 | 25.0 | 7.0 | 7.0 | 7.0 | 7.0 |
| | Bio-insoluble inorganic fiber | 0.0 | 0.0 | 0.0 | 0.0 | 0.0 | 0.0 | 0.0 | 0.0 | 0.0 |
| Binding material | Phenol resin | 17.0 | 17.0 | 17.0 | 17.0 | 17.0 | 17.0 | 17.0 | 17.0 | 17.0 |
| Friction adjusting material | Cashew dust | 8.0 | 8.0 | 8.0 | 8.0 | 8.0 | 8.0 | 8.0 | 8.0 | 8.0 |
| | Rubber dust | 8.0 | 8.0 | 8.0 | 8.0 | 8.0 | 8.0 | 8.0 | 8.0 | 8.0 |
| | Barium sulfate | 35.0 | 29.0 | 16.0 | 35.5 | 11.0 | 24.0 | 19.0 | 37.0 | 4.0 |
| | Plate-like potassium titanate | 0.0 | 0.0 | 0.0 | 0.0 | 0.0 | 0.0 | 0.0 | 0.0 | 0.0 |
| | Potassium titanate *1 | 10.0 | 10.0 | 10.0 | 10.0 | 10.0 | 15.0 | 20.0 | 2.0 | 35.0 |
| | Zirconium silicate | 5.0 | 5.0 | 5.0 | 5.0 | 5.0 | 5.0 | 5.0 | 5.0 | 5.0 |
| | Graphite | 8.0 | 8.0 | 8.0 | 8.0 | 8.0 | 8.0 | 8.0 | 8.0 | 8.0 |
| Rust removal rate after 100 brakings (%) | | 91.0 | 90.0 | 96.0 | 81.0 | 98.0 | 91.0 | 92.0 | 91.0 | 92.0 |
| Friction material wear amount at 400° C. [mm] | | 0.90 | 0.90 | 0.95 | 0.90 | 1.20 | 0.95 | 0.90 | 1.25 | 1.30 |
| Rust removability | | A | A | A | B | A | A | A | A | A |
| Friction material wear property at 400° C. | | A | A | A | A | B | A | A | B | B |
| Working environment and health | | A | A | A | A | A | A | A | A | A |

*1: Potassium titanate having a shape having a plurality of convex portions

TABLE 2

| Blending material, % by volume | | Comparative Example 1 | Comparative Example 2 | Comparative Example 3 | Reference Example 1 |
|---|---|---|---|---|---|
| Fiber base material | Aramid fiber | 8.0 | 8.0 | 8.0 | 8.0 |
| | Copper fiber | 0.0 | 0.0 | 0.0 | 7.0 |
| | Bio-soluble inorganic fiber | 7.0 | 0.0 | 0.0 | 0.0 |
| | Bio-insoluble inorganic fiber | 0.0 | 7.0 | 7.0 | 0.0 |
| Binding material | Phenol resin | 17.0 | 17.0 | 17.0 | 17.0 |

TABLE 2-continued

| Blending material, % by volume | | Comparative Example 1 | Comparative Example 2 | Comparative Example 3 | Reference Example 1 |
|---|---|---|---|---|---|
| Friction adjusting material | Cashew dust | 8.0 | 8.0 | 8.0 | 8.0 |
| | Rubber dust | 8.0 | 8.0 | 8.0 | 8.0 |
| | Barium sulfate | 29.0 | 29.0 | 29.0 | 29.0 |
| | Plate-like potassium titanate | 10.0 | 0.0 | 10.0 | 10.0 |
| | Potassium titanate *1 | 0.0 | 10.0 | 0.0 | 0.0 |
| | Zirconium silicate | 5.0 | 5.0 | 5.0 | 5.0 |
| | Graphite | 8.0 | 8.0 | 8.0 | 8.0 |
| Rust removal rate after 100 brakings (%) | | 91.0 | 93.0 | 92.0 | 92.0 |
| Friction material wear amount at 400° C. [mm] | | 1.60 | 0.95 | 1.50 | 1.50 |
| Rust removability | | A | A | A | A |
| Friction material wear property at 400° C. | | C | A | C | A |
| Working environment and health | | A | C | C | A |

*1: Potassium titanate having a shape having a plurality of convex portions

TABLE 3

| Blending Material, % by volume | | Example 2 | Comparative Example 1 | Comparative Example 2 | Comparative Example 3 | Reference Example 1 |
|---|---|---|---|---|---|---|
| Fiber base material | Aramid fiber | 8.0 | 8.0 | 8.0 | 8.0 | 8.0 |
| | Copper fiber | 0.0 | 0.0 | 0.0 | 0.0 | 7.0 |
| | Bio-soluble inorganic fiber | 7.0 | 7.0 | 0.0 | 0.0 | 0.0 |
| | Bio-insoluble inorganic fiber | 0.0 | 0.0 | 7.0 | 7.0 | 0.0 |
| Binding material | Phenol resin | 17.0 | 17.0 | 17.0 | 17.0 | 17.0 |
| Friction adjusting material | Cashew dust | 8.0 | 8.0 | 8.0 | 8.0 | 8.0 |
| | Rubber dust | 8.0 | 8.0 | 8.0 | 8.0 | 8.0 |
| | Barium sulfate | 29.0 | 29.0 | 29.0 | 29.0 | 29.0 |
| | Plate-like potassium titanate | 0.0 | 10.0 | 0.0 | 10.0 | 10.0 |
| | Potassium titanate *1 | 10.0 | 0.0 | 10.0 | 0.0 | 0.0 |
| | Zirconium silicate | 5.0 | 5.0 | 5.0 | 5.0 | 5.0 |
| | Graphite | 8.0 | 8.0 | 8.0 | 8.0 | 8.0 |
| Shear strength of test piece at 400° C. [kN] | | 1.6 | 0.9 | 1.5 | 1.2 | 1.5 |
| Friction material strength | | B | D | B | C | B |

*1: Potassium titanate having a shape having a plurality of convex portions

In the tables, "potassium titanate" is potassium titanate having an average particle diameter of 10 μm and a shape having a plurality of convex portions of the present invention ("TERRACESS JP" manufactured by Otsuka Chemical Co., Ltd.), "plate-like potassium titanate" is plate-like particles having an average particle diameter of 10 μm ("TXAX-MA, manufactured by Kubota Corporation), and is different from the potassium titanate of the present invention. Further, in the tables, the bio-soluble fiber is $SiO_2$—MgO—SrO-based bio-soluble fiber having a shot content of 60% (Biostar 200/50 manufactured by ITM Co., Ltd.), and the bio-insoluble fiber is CERAMIC FIBER SC BULK 1400 manufactured by Shin-Nippon Thermal Ceramics Corporation.

From the above-mentioned results, it is found that the friction materials of the present invention (Examples 1 to 9) provide excellent results in all of rust removability, wear resistance and working environment and health, as compared to Comparative Examples 1 to 3. In particular, from the results of Table 3, it is found that while in the case of using the plate-like potassium titanate, the friction material strength was decreased in a high temperature region when the bio-soluble or bio-insoluble inorganic fiber was used (Comparative Examples 1 and 3), in the case of using the potassium titanate of the present invention, the friction material strength was rather improved in a high temperature region by using the bio-soluble inorganic fiber. Then, from comparison with Reference Example 1, it is found that the friction materials of the present invention (Example 1 to 9) provide the excellent results equivalent to a conventional friction material containing an ordinary copper element, in all of rust removability, wear resistance and working environment and health, in spite of containing no copper element.

According to the present invention, therefore, the excellent friction material having good rust removability and having wear resistance and friction material strength in a high temperature region can be obtained by using the titanate compound having a shape having a plurality of convex portions and further in spite of using the bio-soluble inorganic fiber.

While the present invention has been described in detail and with reference to specific embodiments thereof, it will be apparent to those skilled in the art that various changes and modifications can be made therein without departing from the spirit and scope of the present invention. This application is based on Japanese Patent Application No. 2011-201072 filed on Sep. 14, 2011 and Japanese Patent Application No. 2012-158743 filed on Jul. 17, 2012, the contents of which are incorporated herein by reference.

DESCRIPTION OF REFERENCE NUMERALS AND SIGNS

1 . . . Titanate compound of the present invention
2 . . . Convex portion

The invention claimed is:

1. A friction material, comprising:
   at least one kind of a titanate compound having a shape having a plurality of convex portions; and
   a $SiO_2$—MgO—SrO-based bio-soluble inorganic fiber containing silicon dioxide ($SiO_2$), magnesium oxide (MgO) and strontium oxide (SrO) as a chemical component thereof, the bio-soluble inorganic fiber containing shots in an amount of 0.1 to 70% by volume of the bio-soluble inorganic fiber.

2. The friction material according to claim 1, wherein the bio-soluble inorganic fiber is contained in an amount of 0.5 to 25% by volume.

3. The friction material according to claim 1, wherein at least one kind of the titanate compound having a shape having a plurality of convex portions is contained in an amount of 2 to 35% by volume.

4. The friction material according to claim 1, containing no copper element.

5. The friction material according to claim 2, wherein at least one kind of the titanate compound having a shape having a plurality of convex portions is contained in an amount of 2 to 35% by volume.

* * * * *